United States Patent
Tomko et al.

(10) Patent No.: US 12,252,277 B2
(45) Date of Patent: Mar. 18, 2025

(54) UNMANNED AERIAL VEHICLE WITH HOLLOW INTERIOR PORTION IN TRUSS

(71) Applicant: Lifting Drones, LLC, Schenectady, NY (US)

(72) Inventors: Andrew John Tomko, Glenville, NY (US); Sean Andrew Tomko, Niskayuna, NY (US)

(73) Assignee: Lifting Drones, LLC, Schenectady, NY (US)

( * ) Notice: Subject to any disclaimer, the term of this patent is extended or adjusted under 35 U.S.C. 154(b) by 0 days.

(21) Appl. No.: 18/459,623

(22) Filed: Sep. 1, 2023

(65) Prior Publication Data

US 2024/0101285 A1    Mar. 28, 2024

Related U.S. Application Data

(60) Provisional application No. 63/377,392, filed on Sep. 28, 2022.

(51) Int. Cl.
| | |
|---|---|
| *B64U 10/16* | (2023.01) |
| *B64C 1/08* | (2006.01) |
| *B64U 20/70* | (2023.01) |
| *B64U 50/11* | (2023.01) |
| *B64U 101/60* | (2023.01) |

(52) U.S. Cl.
CPC ............... *B64U 10/16* (2023.01); *B64C 1/08* (2013.01); *B64U 20/70* (2023.01); *B64U 50/11* (2023.01); *B64U 2101/60* (2023.01)

(58) Field of Classification Search
CPC ........ B64U 10/13; B64U 10/14; B64U 10/16; B64U 50/11; B64U 50/12; B64U 2101/60; B64U 2101/64
See application file for complete search history.

(56) References Cited

U.S. PATENT DOCUMENTS

| | | | | |
|---|---|---|---|---|
| 3,017,138 | A * | 1/1962 | Flint | ......................... B64B 1/40 244/3 |
| 3,053,480 | A * | 9/1962 | Vanderlip | ............... B64C 27/54 244/17.13 |
| 9,043,052 | B2 | 5/2015 | So et al. | |
| 9,944,366 | B2 | 4/2018 | Tang | |
| 2016/0318609 | A1 * | 11/2016 | Lynn | ........................ B64D 1/22 |

(Continued)

FOREIGN PATENT DOCUMENTS

| | | |
|---|---|---|
| KR | 101619836 B1 | 5/2016 |
| WO | WO-2017010439 A1 * | 1/2017 |

(Continued)

*Primary Examiner* — Tye William Abell
*Assistant Examiner* — Justin Michael Heston
(74) *Attorney, Agent, or Firm* — Hoffman Warnick LLC

(57) ABSTRACT

An unmanned aerial vehicle (UAV). The UAV includes a plurality of combustion engine modules, each combustion engine module including a respective helicopter blade propulsion system. A truss connects and separates adjacent pairs of the combustion engine modules of the plurality of combustion engine modules. Each truss includes a hollow interior portion configured to hold a fuel for at least one of the plurality of combustion engine modules. The UAV also includes a control system configured to allow a user to control the plurality of combustion engine modules and corresponding helicopter blade propulsion systems.

20 Claims, 7 Drawing Sheets

(56) References Cited

U.S. PATENT DOCUMENTS

| | | |
|---|---|---|
| 2017/0158320 A1 | 6/2017 | Bosch |
| 2017/0247107 A1 | 8/2017 | Hauer et al. |
| 2017/0297681 A1* | 10/2017 | Yamada ................ B64U 10/13 |
| 2018/0178907 A1* | 6/2018 | Tovkach ................ B64U 10/13 |
| 2020/0031438 A1* | 1/2020 | Moses ................... G01S 5/0231 |
| 2020/0109698 A1 | 4/2020 | Pedersen et al. |
| 2020/0140087 A1 | 5/2020 | Fulbright |
| 2020/0331603 A1 | 10/2020 | Green |
| 2021/0024333 A1 | 1/2021 | Pedersen et al. |
| 2021/0403160 A1* | 12/2021 | Jeng ......................... F02C 7/00 |
| 2024/0083576 A1* | 3/2024 | Lavigne ................ B64C 39/024 |

FOREIGN PATENT DOCUMENTS

| | | | |
|---|---|---|---|
| WO | 2019001662 A1 | 1/2019 | |
| WO | 2019001665 A1 | 1/2019 | |
| WO | WO-2021183576 A1 * | 9/2021 | ............. B64C 11/28 |

\* cited by examiner

UNMANNED AERIAL VEHICLE WITH HOLLOW INTERIOR PORTION IN TRUSS

TECHNICAL FIELD

The disclosure relates generally to an unmanned aerial vehicle (UAV), and more particularly, to a UAV including a hollow interior portion in a truss.

BACKGROUND

Building large or heavy objects, such as skyscrapers, wind turbines, and oil rigs often includes transporting large components and materials to the site of assembly. Moreover, once transported, lifting the large components and/or materials to assemble or construct, e.g., a component of a building or wind turbine, presents significant challenges. Lifting heavy or large loads is typically done with traditional cranes, which have limited lift capacity. Moreover, moving cranes, especially large, masted cranes, presents its own challenges. For example, transportation of a large, masted heavy lift crane may require improvements to roadways, bridges, and infrastructure that can support the weight and size of large, masted cranes. Further, large, masted crane rentals are costly. A party wishing to use a large, masted crane will incur daily rental fees from the day the crane leaves its "base" until the crane returns to its base. Areas that may require a large, masted crane are often inconveniently located relative to the "base," and rental costs for the travel, in addition to the use of the crane, can be substantial. In the case of a wind turbine farm, the costs associated with the rental of the crane may cause service of wind turbines to be postponed. The postponing means less electricity is generated by the wind farm, which is not advantageous.

Regarding wind turbines, wind turbine blades have a limited life span. Some estimates of wind turbine blade life are about 20 years. Thus, servicing a wind turbine may require transporting and installing a new wind turbine blade in challenging locations such as an on-shore or mountain top location. There may be significant challenges in transporting a new wind turbine blade to, for example, mountain top locations because roads may limit the size of the load that can be transported thereon. Also, vehicle congestion may make passage on surface roads nearly impossible.

With respect to offshore wind farms, a barge can transport the large, masted crane to the offshore wind farm. However, a given seaport may not be adequate to handle a large, masted crane, and the docks and infrastructure therein may require modification to transport a large, masted crane to a barge. Further, the barge itself must be large enough to support, and stable enough to position, a large, masted crane for use in servicing the offshore wind farms. Thus, using a large, masted crane for off-shore locations presents difficult and costly challenges.

Heavy lift aircraft may provide a viable alternative to ground or boat transportation of, e.g., wind turbine blades, but are limited in the load that they can lift. Currently, heavy lift aircraft may be limited to about 23,000 lbs. (about 10,430 kgs). Only a few US military lifting helicopters are rated up to about 26,000 pounds of lift (about 11,800 kgs). Therefore, traditional helicopters do not have the load or lifting capacity necessary to work on wind turbines. Servicing and/or assembling wind turbines may be economically restrictive. For example, where a wind farm owner may not service a wind turbine until multiple wind turbines need servicing, it can result in an undesirable reduction of turbine energy output.

BRIEF DESCRIPTION

All aspects, examples, and features mentioned below can be combined in any technically possible way.

An aspect of this disclosure includes an unmanned aerial vehicle (UAV), including a plurality of combustion engine modules, each combustion engine module including a respective helicopter blade propulsion system; a truss connecting and separating adjacent pairs of the combustion engine modules of the plurality of combustion engine modules, wherein each truss includes a hollow interior portion configured to hold a fuel for at least one of the plurality of combustion engine modules; and a control system configured to allow a user to control the plurality of combustion engine modules and corresponding helicopter blade propulsion systems.

Another aspect of this disclosure includes any of the preceding aspects, where the plurality of combustion engine modules includes an even number of combustion engine modules.

Another aspect of this disclosure includes any of the preceding aspects, where the respective helicopter blade propulsion systems of a first set the combustion engine modules in the plurality of combustion engine modules rotate in a first direction and where the respective helicopter blade propulsion systems of a second set of the combustion engine modules in the plurality of combustion engine modules rotate in a second direction opposite the first direction.

Another aspect of this disclosure includes any of the preceding aspects, where the truss is a triangular truss.

Another aspect of this disclosure includes any of the preceding aspects, further including a lifting harness connected to two or more combustion engine modules in the plurality of combustion engine modules, the lifting harness configured to couple to a load, where the lifting harness positions the load directly beneath a center point common to the combustion engine modules of the plurality of combustion engine modules, where the load induces compression in the truss.

Another aspect of this disclosure includes any of the preceding aspects, further including at least one baffle plate within the hollow interior portion of the truss and configured to reduce movement of a fuel within the hollow interior portion of the truss.

Another aspect of this disclosure includes any of the preceding aspects, where the at least one baffle plate includes a plurality of baffle plates.

Another aspect of this disclosure includes any of the preceding aspects, further including at least one fuel pump within a combustion engine module in the plurality of combustion engine modules and configured to pump fuel between the hollow interior portion of the truss, where the controller controls at least one fuel pump and is configured to balance a weight of the fuel between the plurality of combustion engine modules through the fuel pump.

Another aspect of this disclosure includes any of the preceding aspects, including an unmanned aerial vehicle (UAV), including a plurality of combustion engine modules, each combustion engine module including a helicopter blade propulsion system; a truss connecting and separating adjacent pairs of the combustion engine modules of the plurality of combustion engine modules, each truss including a support lattice connecting three truss chords, where the support lattice and three truss chords include a hollow interior portion configured to hold a fuel for the plurality of combustion engine modules, and a control system configured to allow a user to control the plurality of combustion engine modules and corresponding helicopter blade propulsion systems; and a lifting harness connected to two or more combustion engine modules in the plurality of combustion engine modules, the lifting harness configured to couple to a load, where the lifting harness positions the load directly beneath a center point common to the combustion engine modules of the plurality of combustion engine modules.

Another aspect of this disclosure includes any of the preceding aspects, where the plurality of combustion engine modules includes an even number of combustion engine modules.

Another aspect of this disclosure includes any of the preceding aspects, where the respective helicopter blade propulsion systems of a first set the combustion engine modules in the plurality of combustion engine modules rotate in a first direction and where the respective helicopter blade propulsion systems of a second set of the combustion engine modules in the plurality of combustion engine modules rotate in a second direction opposite the first direction.

Another aspect of this disclosure includes any of the preceding aspects, where the truss is a triangular truss.

Another aspect of this disclosure includes any of the preceding aspects, further including a plurality of baffle plates within the hollow interior portion in each truss, each baffle plate in the plurality of baffle plates configured to reduce movement of the fuel within the hollow interior portion in the three truss chords.

Another aspect of this disclosure includes any of the preceding aspects, further including a fuel pump within a combustion engine module in the plurality of combustion engine modules and configured to pump fuel between the hollow interior portion of the three chords and support lattice, where the controller controls the fuel pump to balance a weight of the fuel between the three chords.

Another aspect of this disclosure includes any of the preceding aspects, further including a floatation device coupled to the truss.

Another aspect of this disclosure includes any of the preceding aspects, including an unmanned aerial vehicle (UAV), including a plurality of combustion engine modules, each combustion engine module including a helicopter blade propulsion system; a truss connecting and separating adjacent pairs of the combustion engine modules, each truss including a support lattice connecting each of a first truss chord, a second truss chord, and a third truss chord, where the first truss chord, the second truss chord, and the third truss chord of include a hollow interior portion configured to hold a fuel for the plurality of combustion engine modules; a conduit connecting the hollow interior portion of the first chord of a first truss to the hollow interior portion of the first chord of a second truss a control system configured to allow a user to control the plurality of combustion engine modules and corresponding helicopter blade propulsion systems; and a lifting harness connected to two or more combustion engine modules in the plurality of combustion engine modules, the lifting harness configured to couple to a load, where the lifting harness positions the load directly beneath a center point common to the combustion engine modules of the plurality of combustion engine modules.

Another aspect of this disclosure includes any of the preceding aspects, where the plurality of combustion engine modules includes an even number of combustion engine modules.

Another aspect of this disclosure includes any of the preceding aspects, where the conduit is attached on an exterior of the truss.

Another aspect of this disclosure includes any of the preceding aspects, further including a plurality of baffle plates within the hollow interior portion of each truss.

Another aspect of this disclosure includes any of the preceding aspects, further including at least one floatation device coupled to at least one truss.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein.

Figure 1:
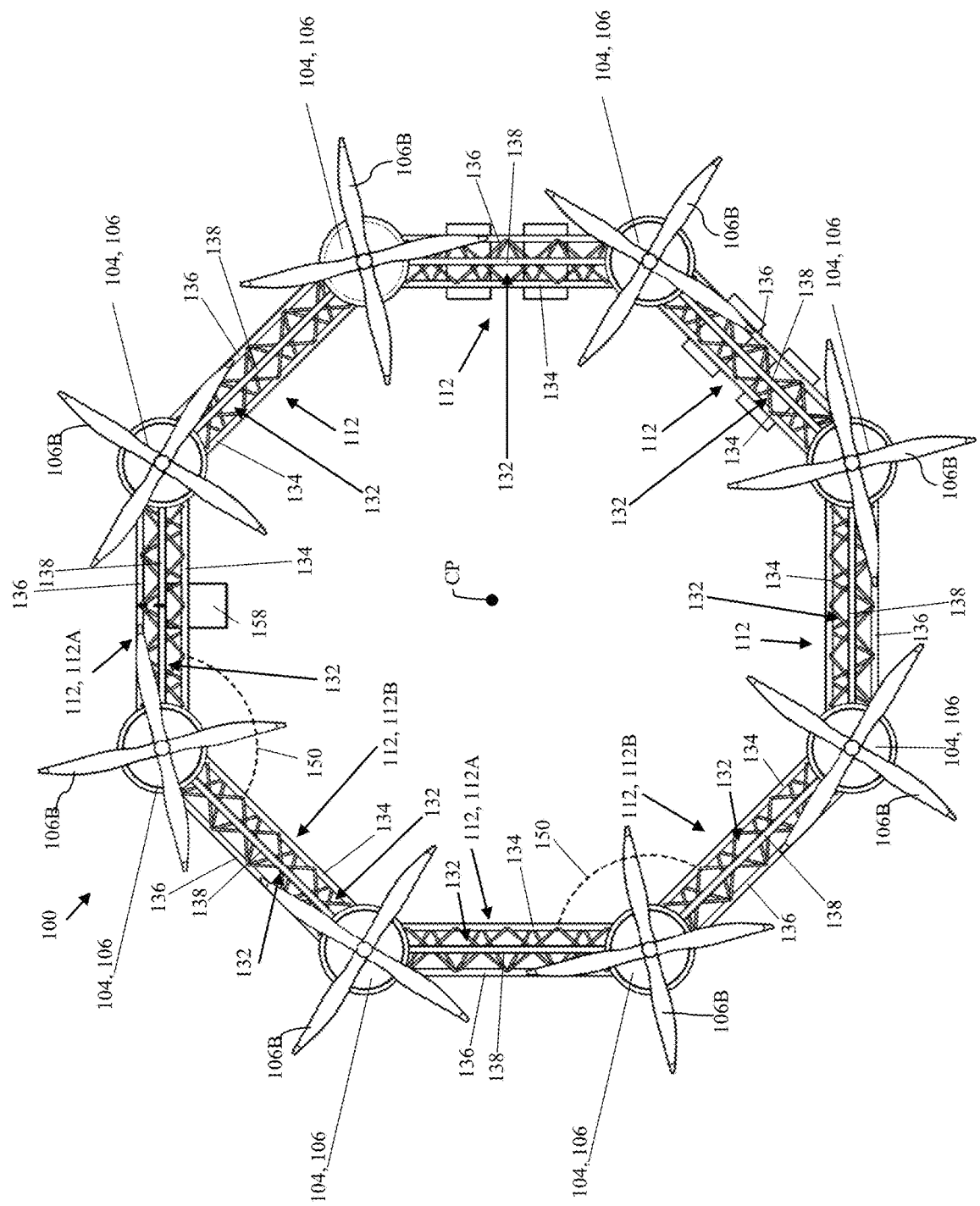
FIG. 1 illustrates top-down schematic view of an unmanned aerial vehicle according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant components within an unmanned aerial vehicle (UAV) for lifting loads. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

It is often required to describe parts that are disposed at differing radial positions with regard to a center axis. The term "radial" may refer to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" may refer to movement or position parallel to an axis. Finally, the term "circumferential" may refer to movement or position around an axis. It will be appreciated that such terms may be applied in relation to a center axis of the UAV.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof "Optional" or "optionally" means that the subsequently described event or circumstance may or may not occur or that the subsequently describe component or element may or may not be present, and that the description includes instances where the event occurs, or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of this disclosure includes an unmanned aerial vehicle (UAV). The UAV includes a plurality of combustion engine modules, each combustion engine module including a respective helicopter blade propulsion system. A truss connects and separates adjacent pairs of the combustion engine modules of the plurality of combustion engine modules. Each truss includes a hollow interior portion configured to hold a fuel for at least one of the plurality of combustion engine modules. The UAV also includes a control system configured to allow a user to control the plurality of combustion engine modules and corresponding helicopter blade propulsion systems. By including hollow interior portions in the truss, the UAV may lift and transport large and/or heavy loads over long distances by expanding the UAV's fuel capacity with an internal fuel reservoir.

Figure 2:
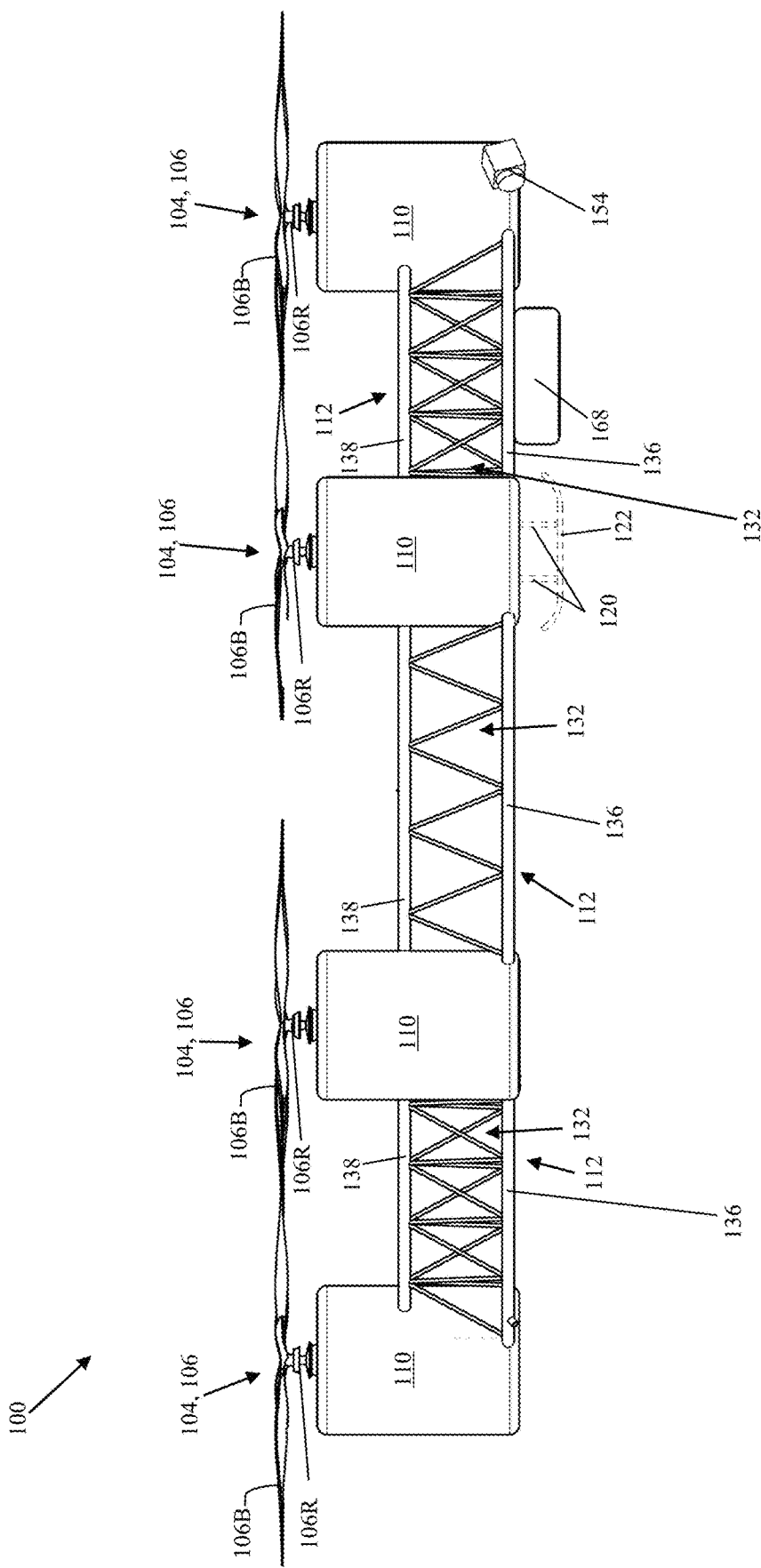
FIG. 2 illustrates a side schematic view of an unmanned aerial vehicle according to embodiments of the disclosure.
Figure 3:
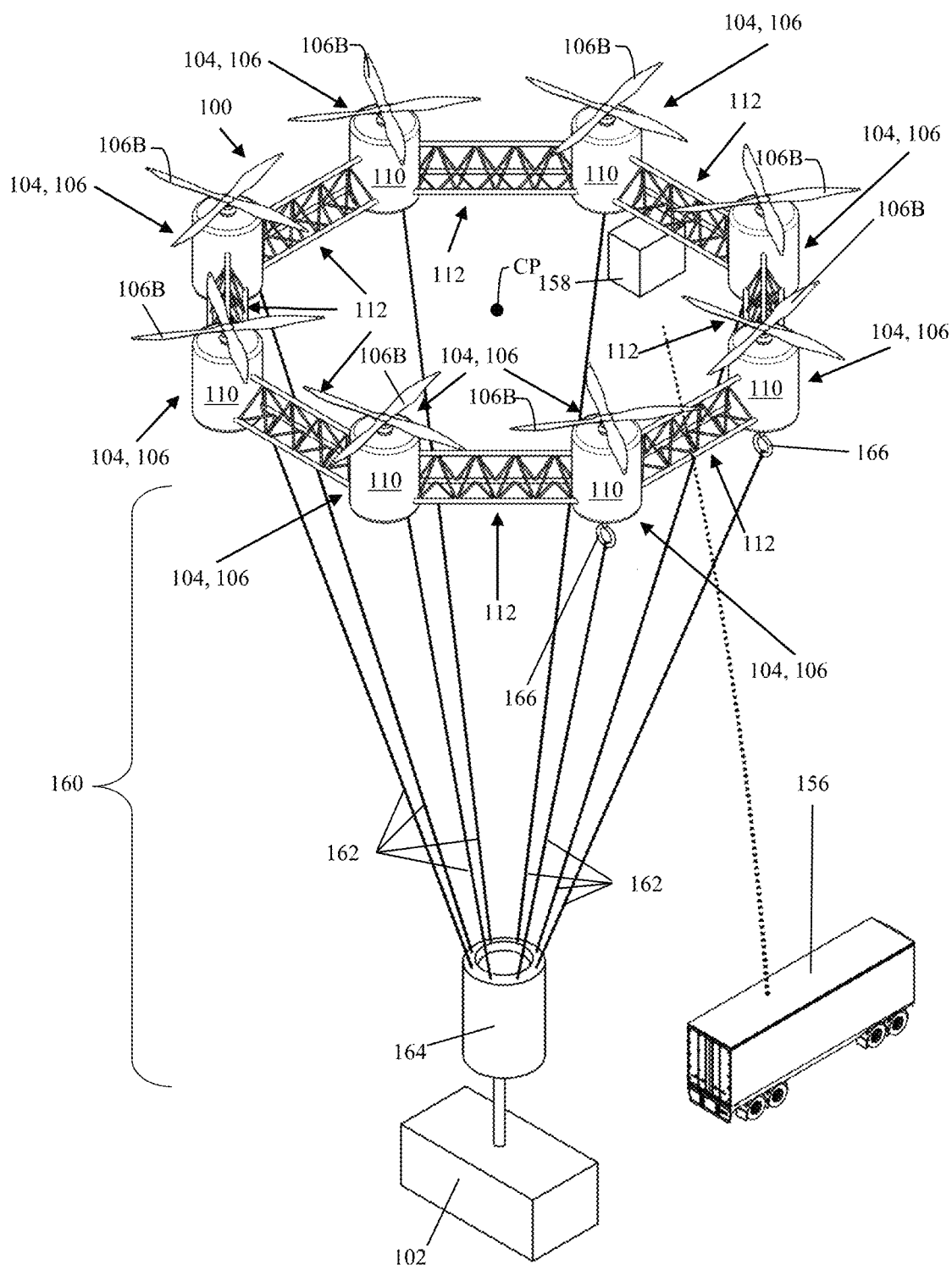
FIG. 3 illustrates a perspective schematic view of a load connected to an unmanned aerial vehicle according to embodiments of the disclosure.

FIGS. 1-3 show various perspectives of an unmanned aerial vehicle (UAV) 100 according to embodiments of this disclosure. A UAV is an aeronautical device (i.e., it is capable of taking flight) that may be remotely operated by a user, or may be configured to function autonomously or semi-autonomously. That is, UAV 100 does not require an on-vehicle pilot to fly. UAV 100 may be used to lift a load 102 (FIG. 3), which may be a large and/or heavy object or objects (such as a wind turbine blade), and transport them over large distances through the air. For example, where it may be impractical to move wind turbine components because of their large sizes, UAV 100 can transport the wind turbine components via air travel. Other applications of the UAV 100 may include transporting components for the assembly and maintenance of offshore oil rigs, bridge assemblies, mounting of equipment on tall buildings, and fighting fires. In terms of fighting fires, UAV 100 may allow substantial amounts of water to be spotted directly on a given area. For wind turbines, cones, and blades, the parts may be partially assembled and managed in one location far from the site on which the wind turbine will ultimately be assembled and operated. In these circumstances, UAV 100 may transport, e.g., the cone assembly, from the first location to the wind turbine assembly and operation site. Thus, UAV 100 may replace, e.g., helicopters and planes for transporting large loads through air travel. UAV 100 may be a variety of shapes, weights, and sizes. For example, UAV 100 may take the form of an approximately circular shape. In some implementations, UAV 100 may lift large a large load, e.g., load 102 may be up to 125 tons (250,000 pounds). UAV 100 may be of any size sufficient to lift and transport heavy loads, e.g., UAV 100 may have a diameter of between about 300 and about 400 feet (between about 91 meters and about 122 meters).

As mentioned throughout this disclosure, UAV 100 and its components may be modular, i.e., each component may be removed individually and swapped. An advantage of the modular UAV 100 described herein is that manufacturing costs are reduced for UAV 100's components. Since UAV 100 may include modular sections, interchangeability is an advantage for maintenance and for ground transportation, i.e., UAV 100 does not need a large factory to be constructed, maintained, stored, or assembled. Moreover, many, or all, components described herein can be easily removed, swapped, or arranged in any conceivable combination.

Still referring to FIGS. 1-3, UAV 100 may include a plurality of combustion engine modules 104 to convert fuel into rotational energy, ultimately helping to lift UAV 100. Specifically, combustion engine modules 104 may use a combustible, liquid fuel source (e.g., a petroleum product such as gasoline, diesel fuel, jet fuel, etc.) to generate rotational energy to power a corresponding helicopter blade propulsion system 106 coupled thereto. A helicopter blade propulsion system is a system for providing upward thrust for UAV 100 through rotating a set of blades and is discussed in further detail herein. That is, combustion engine modules 104 may be similar to engines used in helicopters. Each combustion engine manufacturer designs their respective combustion engines modules with the goals of reducing volume and weight. Thus, combustion engine modules 104 may include, e.g., a low vertical height. Additionally, combustion engine modules and their respective helicopter blade propulsion systems, may be used in many different applications, so manufacturers design each combustion engine module or helicopter blade propulsion system with the intended function or application in mind. For example, General Electric Co. developed the largest combustion engine module in the free marketplace, which may produce over 39,000 horsepower and may be useful for lifting heavy loads. UAV 100 may include any number of combustion engine modules 104, including two or more combustion engine modules 104. In some implementations, plurality of combustion engine modules 104 may include an even number of combustion engine modules 104. All combustion engine modules 104 need not be operational at all times for UAV 100 to be operational or take flight, however, and the number of operating combustion engine modules 104 may be determined based upon the lift needed in the operation of UAV 100. For example, the number of operating combustion engines modules 104 may be in pairs or all in unison to provide more upward thrust.

Figure 5:
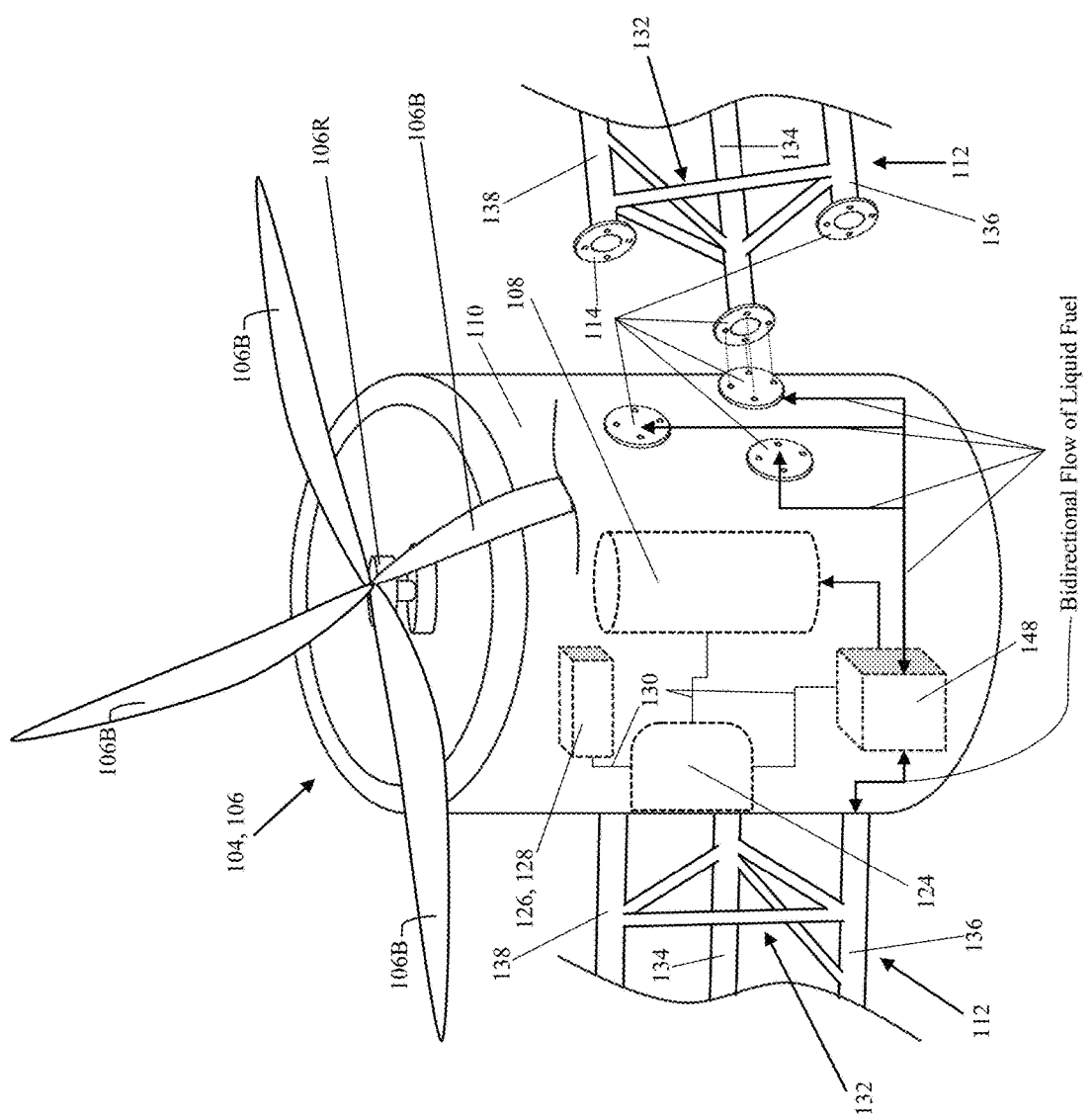
FIG. 5 illustrates a truss connecting to a combustion engine module through bolted flanges and internal components of the combustion engine module, according to embodiments of the disclosure.
Figure 7:
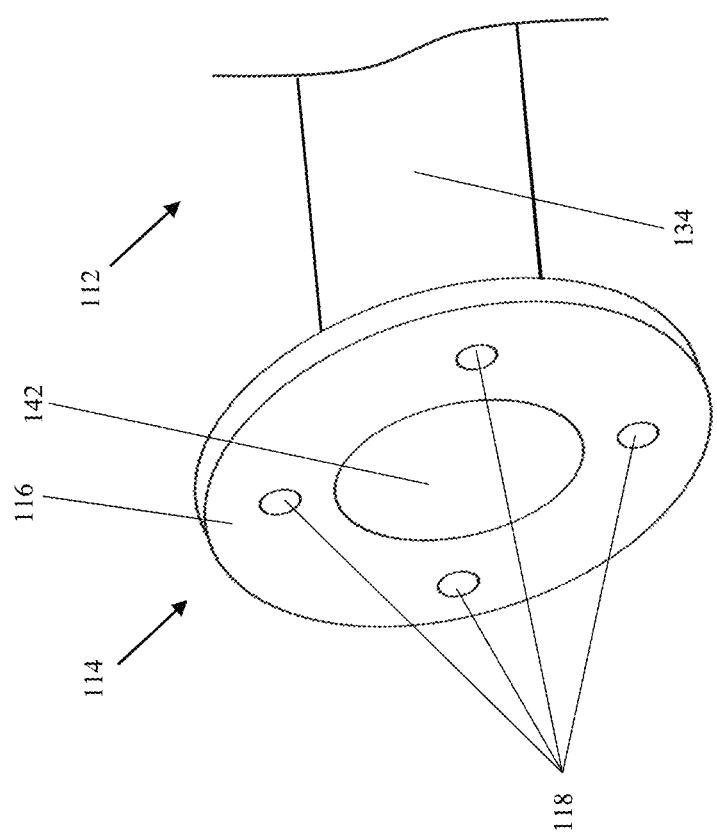
FIG. 7 illustrates an enlarged view of a portion of a truss and a bolted flange, according to embodiments of the disclosure.

Referring now to FIGS. 2 and 5, with FIG. 5 showing an enlarged perspective of a combustion engine module 104 and helicopter blade propulsion system 106, combustion engine modules 104 may include myriad subcomponents, including an internal combustion mechanism 108, e.g., cylinders, pistons, fuel injectors, etc. and associated subcomponents (none of which are shown for simplicity). Internal combustion mechanism 108 may be any device capable of internal combustion to generate energy. Combustion engine modules 104 may also optionally include a housing 110 around internal combustion mechanism 108 and other internal components of combustion engine modules 104. Housing 110 may be made of any sturdy material, including, e.g., aluminum, plastic, fiberglass, etc., and may protect the internal components of combustible engine modules 104 from wear. Housing 110 may also provide secure connection points thereon that connect each adjacent combustion engine modules 104 through a truss 112. A truss is a support structure that supports loads over a span and is described in further detail herein. Housing 110 may be connected to truss 112 with, e.g., welds, bolted flanges, or other connection mechanisms (best illustrated in FIG. 5). Bolted flanges 114 are mechanical devices that connect two sections of pipes, valves, or equipment together and typically include a circular metal rings 116 with holes 118 (shown in FIG. 7, which shows an enlarged illustration of bolted flange 114) for bolts around the perimeter. Here, bolted flanges 114 may be in or on housing 110 of each combustion engine module 104, allowing truss 112 to connect to housing 110. For example, as shown in FIG. 5, each housing 110 of combustion engine modules 104 may include bolted flange 114 on opposite sides thereof for connecting ends of a corresponding truss 112. Bolted flange 114 may include, e.g., four or more holes for a bolt or screw to affix truss 112 to housing 110, as shown in FIG. 5 with four dotted lines extending from holes 118 of bolted flange 114 on truss 112 to four bolt holes 118 on bolted flange 114. Bolted flange 114 is illustrated as including four holes 118 for simplicity but may include as many holes 118 as necessary, depending on flange size.

Combustion engine modules 104 may also include telescoping legs 120 (illustrated in phantom in FIG. 2) extending from the bottom of housing 110 and upon which each combustion engine module 104 may stand on a surface. Telescoping legs 120 of combustion engine modules 104 may further include skid pads 122 located on corners of housing 110 to contact the ground thereunder. Skid pads 122 are illustrated on only one combustion engine module 104 for simplicity, but may be on any or all combustion engine modules 104. Additionally, one or more combustion engine modules 104 may include a fuel tank (not illustrated for simplicity) for supplying a fuel thereto. The fuel tank may be located within housing 110 or mounted externally thereto.

Referring to FIG. 5, combustion engine module 104 may further include a battery 124 to power components within UAV 100 or within combustion engine module 104. For example, battery 124 may supply power for startup sequencing for each combustion engine module 104 by, e.g., igniting internal combustion mechanism 108 of combustion engine module 104. Battery 124 may also be provided for powering, e.g., remote ignition capability for combustion engine modules 104. Additionally, battery 124 may provide electricity for a control system (or simply "controller") 126 and/or a communication system 128. A controller is a computing device that may control aspects of UAV 100, and a communication system is a computing device that is networked (i.e., connected to other computing devices) for the purpose of establishing communication between UAV 100 and a receiver. Both controller 126 and communication system 128 are discussed in further detail herein. Battery 124 may provide electrical energy to various components through connections 130, such as combustion engine modules 104, controller 126, communication system 128, or other functions, such as lighting or audible feedback systems to indicate combustion engine module 104 operation characteristics (e.g., power on/off, malfunction codes, etc.). Connections 130 may be any material capable of allowing transfer of electrical energy between a power supply and a device that needs electrical energy. For example, connections 130 may be copper wiring. Additionally, battery 124 may provide electricity for illumination of, e.g., required navigation lights or lights for night operations.

Combustion engine modules 104 may also include electrical interconnections (not shown) between one another for communications, such as hard wiring. The hard wiring electrical interconnections may be electrically coupled using unique connectors, such as but not limited to, Amphenol-type connectors. Amphenol-type connectors may prevent erroneous connections during the assembly process of UAV 100.

Referring to FIGS. 1-3 and 5, each combustion engine module 104 may, include as mentioned previously, a respective helicopter blade propulsion system 106 (such as those provided by General Electric Aviation, Pratt & Whitney, Sikorsky, and others). A helicopter blade propulsion system may include, among other things, a set of blades 106B mounted on a rotor 106R. Blades 106B are rotating wings that enable a vehicle to fly by providing upward thrust, and rotor 106R is a central rotating mechanism attached to blades 106B, thereby allowing blades 106B to spin using rotational energy provided by combustion engine modules 104. Specifically, helicopter blade propulsion system 106 may generate large downward winds, thereby providing sufficient upward thrust or lift to allow UAV 100 to take flight. In some implementations, each combustion engine module 104 and corresponding helicopter blade propulsion system 106 may provide, e.g., a lift capacity of about 33,000 pounds, including a 5:1 safety factor. A safety factor (also known as the "safe working load" and "normal working load" in the art) is the maximum safe force that lifting equipment can lift, suspend, or lower without risking the lifting equipment breaking. That is, the safety factor provides a margin of safety to reduce the risk of failure of the lifting equipment. Thus, a 5:1 safety factor means that UAV 100, in some implementations, can withstand a load that is 5 times greater than the load it will actually lift. UAV 100 may include as many combustion engine modules 104 and helicopter blade propulsion systems 106 as required to obtain the required upward thrust to lift a desired load 102. Additionally, helicopter blade propulsion systems 106 may each be of identical design to one another, or they may differ in make and model between one another. For example, in some implementations, helicopter blade propulsion systems 106 may include an even number of helicopter blade propulsion systems 106, e.g., eight helicopter blade propulsion systems 106 (and eight corresponding combustion engine modules 104). In other circumstances, however, UAV 100 may operate all combustion engine modules 104 when load 102 is coupled to UAV 100. In implementations where UAV 100 includes an even number combustion engine modules 104, each respective helicopter blade propulsion system 106 of a first set of combustion engine modules 104 may rotate in a first direction while a second set of respective helicopter blade propulsion systems 106 of combustion engine modules 104 may rotate in a second direction opposite the first direction. For example, half of helicopter blade propulsion systems 106 may rotate clockwise while another half of helicopter blade propulsion systems 106 may rotate counterclockwise. By including helicopter blade propulsion systems 106 with counter-rotational configurations, UAV 100 may have improved aerodynamics and balance as it lifts load 102. Helicopter blade propulsion systems 106 can vary the pitch of rotors 106R that provide thrust the moves the aircraft in any direction. Pitch is an aircraft's rotation about a lateral axis. For example, with a typical helicopter, pitch describes the position of the helicopter's nose above or below a horizontal axis. Additionally, pitch of blades 106B may be changed individually or collectively for directional control of UAV 100 by, e.g., changing the angles of the blades.

Figure 4:
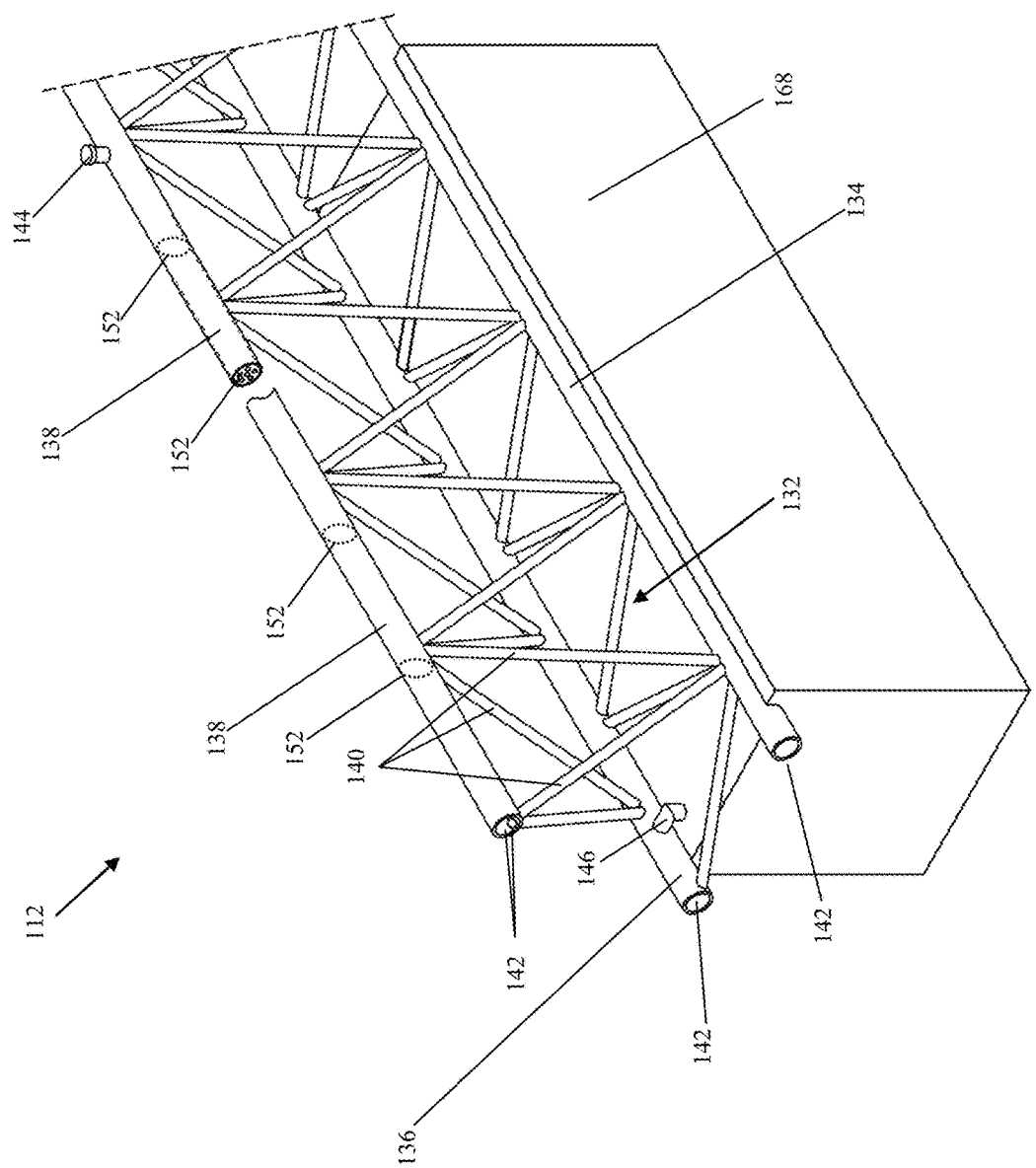
FIG. 4 illustrates a side schematic sectional view of a truss with a hollow interior portion according to embodiments of the disclosure.

Referring to FIGS. 1-3 and 5, UAV 100 may include truss 112 connecting and separating adjacent pairs of combustion engine modules 104 in a plurality of combustion engine modules 104. A truss is a mechanical support structure across a span (i.e., a distance or length) and may be used as structural support to withstand large forces (e.g., tension or compression) created by the combined weights of plurality of combustion engines 104, helicopter blade propulsion systems 106, and load 102. Each truss 112 may further include a support lattice 132 (also known as a "web" in the art) connecting three truss chords (also known as "rafters," "posts," or "struts" in the art). That is, truss 112 may include support lattice 132 connecting each of a first truss chord 134, a second truss chord 136, and a third truss chord 138 (referred to herein simply as "truss chords 134, 136, and 138"), as shown in FIGS. 1, 4, and 5. Each truss 112 and support lattice 132 may include any durable material, such as a metal or alloy, e.g., steel or aluminum. Support lattice 132 may include a series of angle pipes or supports 140 connecting truss chords 134, 136, and 138 to provide further structural strength to truss 112. Angle pipes or supports 140 may be the same or different material as truss chords 134, 136, and 138 and may be welded or otherwise rigidly coupled to first truss chord 134, second truss chord 136, and third truss chord 138 for stability and strength of truss 112. In some implementations, truss 112 may connect combustion engine modules 104 and respective helicopter blade propulsion systems 106 in an approximately circular shape. This approximately circular design puts UAV 100 into compression when lifting load 102, thereby increasing the rigidity of UAV 100's structure. In some implementations, truss 112 may take the form of a triangular truss.

Each truss 112 may further include electrical components, such as sensors and wiring bundled in sheathes (all of which are not shown for simplicity). Sensor may include, for example, pressure gauges, liquid level sensors for monitoring fuel, pitot-static sensors, gyroscopes, altitude sensors, or tachometers. The wiring may connect all or some of the sensors to controller. For example, combustion engine module 104 may be electrically connected to one another through wires that run along or within part of truss 112. Each truss 112 may be wired for lighting, e.g., navigation lighting or flood lights. Accordingly, each truss 112 or support lattice 132 may include electronic mounting hardware for navigation lights and flood lights.

Referring now to FIGS. 4 and 5, each truss 112 may include hollow interior portion 142 configured to hold fuel for at least one combustion engine module 104, thereby defining a fuel reservoir. Hollow interior portion 142 may be a gap, cavity, or otherwise any space within truss 112 or, more specifically, in supporting lattice 132 and/or truss chords 134, 136, and 138. The fuel, as discussed in detail herein, is a combustible liquid fuel supplied to combustion engine modules 104. In some implementations, first truss chord 134, second truss chord 136, and third truss chord 138 may include a hollow interior portion 142 configured to hold a fuel for plurality of combustion engine modules 104. In other implementations, however, support lattice 132 and three truss chords 134, 136, and 138 may include hollow interior portion 142 configured to hold a fuel for combustion engine modules 104. Hollow interior portion 142 may include, e.g., liners necessary to prevent erosion of truss chords 134, 136, and 138 or to protect the quality of the fuel therein.

To fill hollow interior portions 142 of truss 112 and/or support lattice 132, truss 112 may also include a fill and vent system 144 on each chord 134, 136, and 138 (only one shown for simplicity) for adding fuel to chords 134, 136, and 138 and venting any gaseous fumes. Fill and vent system 144 may be disposed, e.g., on top of chords 134, 136, and 138. Chords 134, 136, and 138 may also include fuel drain ports 146 (FIG. 4, only one fuel drain port 146 shown for simplicity) to, e.g., evacuate fuel and vent hollow interior portion 142 as desired.

Referring to FIG. 5, UAV 100 may further include at least one fuel pump 148 within combustion engine module 104 that is configured to pump fuel between hollow interior portion 142 of truss 112. A fuel pump 148 is a device for pumping fluid through UAV 100, and hollow interior portions 142 of trusses 112 and/or support lattice 132. Fuel pump 148 may be disposed within one, many, or all of combustion engine modules 104 for supplying fuel to combustion engine modules 104 or to pump fuel throughout hollow interior portions 142 of trusses 112 and/or support lattice 132 to balance UAV 100. Although illustrated as within housing 110 of combustion engine module 104, fuel pump 148 may be anywhere on UAV 100. Fuel pump 148 may pump fuel from one truss 112 to another truss 112, and vice versa, i.e., fuel pump 148 may pump fuel bidirectionally (as illustrated in FIG. 5). Fuel pump 148 may include standard pump components, e.g., hoses, fluid pumping mechanisms, a motor/pump assembly, a pressure sensor, etc. Such components are known in the art and are not discussed in further detail herein. A controller 126 may control fuel pump 148 and may be configured to balance a weight of the fuel between the plurality of combustion engine modules 104 through fuel pump 148. Controller 126, as mentioned previously and explained fully herein, is a computing device that may control aspects of UAV 100. In some implementations, fuel pump 148 may be configured to pump fuel between hollow interior portions 142 of three chords 134, 136, and 138 and support lattice 132. Fuel pump 148 may also function to fill the fuel tanks of each combustion engine modules 104, according to some implementations. Further, in an embodiment shown in FIG. 1, UAV 100 may include a conduit 150 connecting hollow interior portion 142 of first chord 134 of a first truss 112A to hollow interior portion 142 of first chord 112B of a second truss 112B. Conduits 150 may be devices that allow fuel pump 148 to pump fuel between one or more of the chords 134, 136, and 138 of trusses 112 to advantageously move fuel around UAV 100 for, e.g., balancing UAV 100. Conduits 150 may be made of, e.g., hard pipe or flexible hose. In some implementation, conduit 150 may be attached on an exterior of truss 112.

Figure 6:
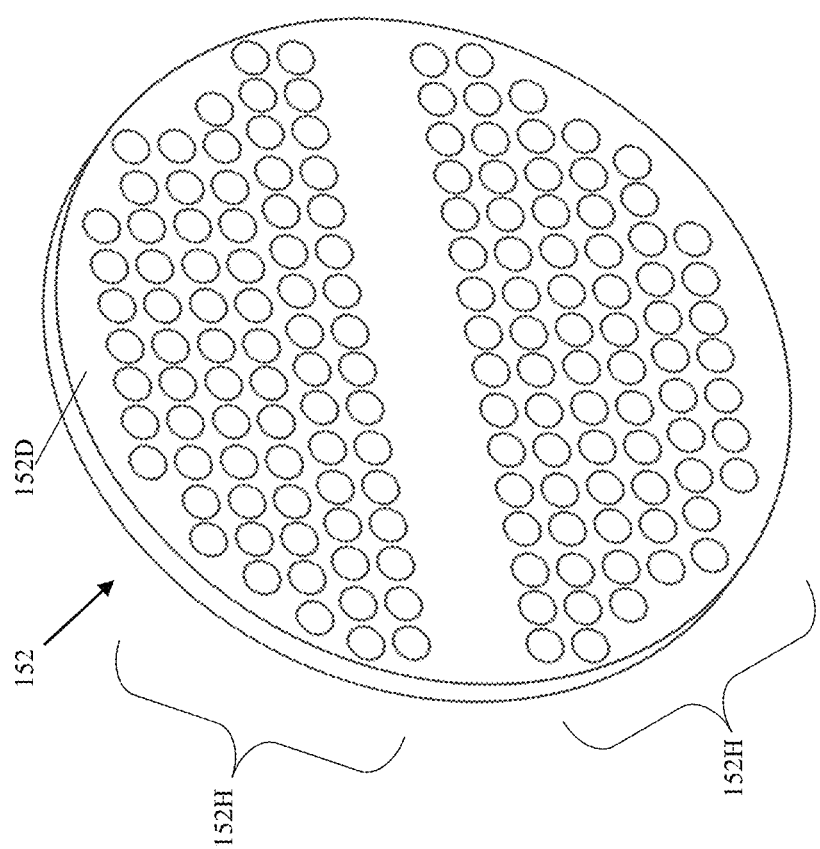
FIG. 6 illustrates an enlarged perspective of a baffle plate, according to embodiments of the disclosure.

Referring now to FIGS. 4 and 6, UAV 100 may further include at least one baffle plate 152 within hollow interior portion 142 of trusses 112 and may be configured to reduce movement of a fuel within hollow interior portion 142 of trusses 112. A baffle plate (known also as a "slosh plate" in the art) is typically a disc 152D with holes 152H (best illustrated in FIG. 6, which shows an enlarged illustration of baffle plate 152) placed perpendicular to sidewalls in a fluid-containing container. Thus, baffle plate 152 may be configured to reduce movement of a fuel within hollow interior portion 142 of trusses 112. Baffle plate 152 may include any durable material, including metal, alloys, and strong polymers. Baffle plate 152 may be coated to be, e.g., corrosion resistant. In some implementations, UAV 100 may include a plurality of baffle plates 152. That is, while only one baffle plate 152 is shown in detail for simplicity, many others may be present, as shown in phantom, throughout truss chords 134, 136, and 138. In yet other implementations, UAV 100 may include plurality of baffle plates 152 within hollow interior portion 142 in each truss 112 or, more specifically, within hollow interior portion 142 of each first truss chord 134, second truss chord 136, and third truss chord 138. Each baffle plate 152 in the plurality of baffle plates 152 may be configured to reduce movement of the fuel within hollow interior portion 142 in truss chords 134, 136, and 138.

Referring to FIG. 1, as mentioned previously, UAV 100 may include control system 126 (or simply "controller") configured to allow a user (not shown) to control plurality of combustion engine modules 104 and/or corresponding helicopter blade propulsion systems 106. Controller 126 may take the form of any conceivable computing device, including microprocessors, microcontrollers, printed circuit boards, etc. Controller 126 may be operatively coupled to anywhere on UAV 100, such as on combustion engine module 104 or a truss 112 (FIG. 1). Controller 126 may be configured to perform myriad monitoring and control functions for UAV 100. For example, in some implementations, controller 126 may provide wireless controls for each combustion engine module 104. In other implementations, controller 126 may monitor and control functioning and operation of aspects of UAV 100, including monitoring and controlling power, rotations-per-minute, etc. of each combustion engine module 104 and helicopter blade propulsion system 106. Controller 126 may also synchronize aspects of UAV 100 functioning, including combustion engine modules 104, fuel supply, etc. Controller 126 may, e.g., measure the amount of fuel in each truss 112 or each chord 134, 136, and 138 of each truss 112, as well each respective fuel tank of each combustion engine module 104, and initiate a pump cycle of fuel pump 148 to, e.g., balance UAV 100 or to supply fuel to combustion engine modules 104. Further, the controller 126 may include controls for advanced avionics. Moreover, controller 126 may include controls for monitoring a planned and approved flight path, employ global positioning system (GPS) for operation and location functions, monitor fuel, and maintain flight history and records (such as via a "black box") of UAV 100. In yet other implementations, controller 126 may include a global positing (GPS) instrumentation. The GPS may provide communication between UAV 100 and with a ground control, i.e., the user. Controller 126 may also include a radar system, which controller 126 may selectively enable so 360° radar coverage can be obtained.

As mentioned previously, UAV 100 may include communication system 128 (FIG. 5). Communication system 128 may be a computing device that is networked (i.e., connected to other computing devices) for the purpose of establishing communication between UAV 100 and a receiver. Communication system 128 may include wireless systems, such as satellite transmitters, Wi-Fi, and Bluetooth or other near field communication devices. Communicated information may include, e.g., data, audio, or visual recordings. Controller 126 and communication system 128 are illustrated as a single module (e.g., on one printed circuit board or housed together) for simplicity, but may be separate devices. For example, communication system 128 may indicate which, if any, combustion engine modules 104 are not operating optimally.

UAV 100 may also include a camera 154 (FIG. 2) on one or more of combustion engine modules 104 or trusses 112 to provide visual feedback and tracking of load 102. Camera 154 may be any optical viewing device or optical light-capture device for capturing and/or transmitting images or videos. Camera 154 may be mounted on UAV 100 for visual feedback and can be directed in any direction, e.g., under control of a user through controller 126. Further, camera 154 may be provided with high zoom capability. Camera 154 may include an audio recorder (e.g., a microphone) in some implementations. Although one camera 154 is illustrated in FIG. 2 for simplicity, UAV 100 may include any number of cameras 154 on, e.g., combustion engine modules 104 and/or trusses 112.

Referring again to FIG. 3, UAV 100 may be piloted and flown remotely from a structure 156 as with current drone technology. Structure 156 may take the form of a control center in which a user may control UAV 100. Structure 156 may be an enclosed structure with insulation to minimize vibrations therein, i.e., structure 156 may be vibration-free. In another embodiment, also shown in FIG. 3, UAV 100 may include an optional, removable cabin 158 mounted thereon, in which a pilot or pilots can control UAV 100. Cabin 158 may be mounted or removed via a mounting mechanism, such as I-beam brackets that connect to the frame of cabin 158. Alternatively, both a pilot in structure 156 and a pilot in cabin 158 may work unison to operate UAV 100.

Still referring to FIG. 3, UAV 100 may include a lifting harness 160 connected to two or more combustion engine modules 104 in plurality of combustion engine modules 104 and configured to couple to load 102. Lifting harness is a device or collection of devices that connect UAV 100 to load 102 for transport thereof. In some implementations, lifting harness 160 may position load 102 directly beneath a center point ("CP") common to each combustion engine modules 104. Lifting harness 160 may including any number any connective devices 162 used to couple load 102 to UAV 100, such as cable, chain, rope, webbing, synthetic (woven nylon or polyester or other synthetic material) web slings, rigging slings, lifting slings, or any combinations thereof, or other lifting materials now known or hereinafter developed. These connecting devices 162 may each have a lifting factor, e.g., in excess of up to 33,000 pounds (15,000 kgs) in a vertical lift. Connecting devices 162 may have a length in a range between about 100 feet and over about 3,000 feet (between about 30 meters and over about 1,000 meters). In one example, connecting devices 162 may be 3,300 feet long to dissipate the massive air flow created by the lift from the helicopter blade propulsion systems 106. Connecting devices 162 of lifting harness 160 may be gathered together at at least one point to form a bridle 164. That is, lifting harness 160 may couple to, and position, load 102 directly beneath CP by coupling to, e.g., a bridle 164. Bridle 164 is a device to which multiple connecting devices 162 of lifting harness 160 may mutually connect at a lower end thereof. When UAV 100 lifts load 102, load 102 induces compression in truss 112, i.e., trusses 112 go into compression through load 102's downward force at CP, adding lateral compressive forces to force trusses 112 together, thereby making UAV 100 more rigid.

Combustion engine modules 104 may also include lifting rings 166 (only two illustrated, in FIG. 3, for clarity) connected to the bottom thereof to connect to load 102 through lifting harness 160 and bridle 164 (FIG. 3). Lifting rings 166 may be mounted on a lower side of UAV 100. In all aspects of the embodiments, a safety factor of 5:1 may be used. A safety factor, as previously mentioned, is the maximum safe force that lifting equipment can lift, suspend, or lower without risking the lifting equipment breaking.

Referring now to FIGS. 2 and 4, UAV 100 may further include at least one floatation device 168 (FIGS. 2 and 4) coupled to at least one truss 112. Floatation devices are known in the art but are generally air-filled containers that float on water, i.e., floatation device 168 may be any conceivable device used to allow an object to float, including, but not limited to, pontoons. In some implementations, floatation device 168 may be operatively coupled to two or more truss chords 134 and 136 (i.e., bottom truss chords). Floatation device 162 (FIGS. 2 and 4) on UAV 100 can be provided for storing or landing UAV 100 on water. Floatation device 162 may be retracted or removed for, e.g., ground transportation or flight.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations may be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. An unmanned aerial vehicle (UAV), comprising: a plurality of combustion engine modules, each combustion engine module including a respective helicopter blade propulsion system; a truss connecting and separating adjacent pairs of the combustion engine modules of the plurality of combustion engine modules, wherein each truss includes a plurality of truss chords, wherein at least one of the truss chords comprises a hollow interior portion therein configured to hold a fuel for at least one of the plurality of combustion engine modules; and a control system configured to allow a user to control the plurality of combustion engine modules and corresponding helicopter blade propulsion systems.

2. The UAV of claim 1, wherein the plurality of combustion engine modules includes an even number of combustion engine modules.

3. The UAV of claim 2, wherein the respective helicopter blade propulsion systems of a first set of the combustion engine modules in the plurality of combustion engine modules rotate in a first direction and wherein the respective helicopter blade propulsion systems of a second set of the combustion engine modules in the plurality of combustion engine modules rotate in a second direction opposite the first direction.

4. The UAV of claim 1, further comprising at least one baffle plate within the hollow interior portion of the plurality of truss chords and configured to reduce movement of a fuel within the hollow interior portion of the plurality of truss chords.

5. The UAV of claim 4, wherein the at least one baffle plate includes a plurality of baffle plates.

6. The UAV of claim 1, wherein the truss is a triangular truss.

7. The UAV of claim 1, further comprising a lifting harness connected to two or more combustion engine modules in the plurality of combustion engine modules, the lifting harness configured to couple to a load, wherein the lifting harness positions the load directly beneath a center point common to the combustion engine modules of the plurality of combustion engine modules, wherein the load induces compression in the truss.

8. The UAV of claim 1, further comprising at least one fuel pump within a combustion engine module in the plurality of combustion engine modules and configured to pump fuel between the hollow interior portion of the plurality of truss chords, wherein the controller controls at least one fuel pump and is configured to balance a weight of the fuel between the plurality of combustion engine modules through the fuel pump.

9. An unmanned aerial vehicle (UAV), comprising: a plurality of combustion engine modules, each combustion engine module including a helicopter blade propulsion system; a truss connecting and separating adjacent pairs of the combustion engine modules of the plurality of combustion engine modules, each truss including a support lattice connecting three truss chords, wherein the support lattice and at least one of the three truss chords include a hollow interior portion therein, configured to hold a fuel for the plurality of combustion engine modules; a control system configured to allow a user to control the plurality of combustion engine modules and corresponding helicopter blade propulsion systems; and a lifting harness connected to two or more combustion engine modules in the plurality of combustion engine modules, the lifting harness configured to couple to a load, wherein the lifting harness positions the load directly beneath a center point common to the combustion engine modules of the plurality of combustion engine modules.

10. The UAV of claim 9, wherein the plurality of combustion engine modules includes an even number of combustion engine modules.

11. The UAV of claim 10, wherein the respective helicopter blade propulsion systems of a first set of the combustion engine modules in the plurality of combustion engine modules rotate in a first direction and wherein the respective helicopter blade propulsion systems of a second set of the combustion engine modules in the plurality of combustion engine modules rotate in a second direction opposite the first direction.

12. The UAV of claim 9, wherein the truss is a triangular truss.

13. The UAV of claim 9, further comprising a plurality of baffle plates within the hollow interior portion in each of the three truss chords, each baffle plate in the plurality of baffle plates configured to reduce movement of the fuel within the hollow interior portion in the three truss chords.

14. The UAV of claim 9, further comprising a fuel pump within a combustion engine module in the plurality of combustion engine modules and configured to pump fuel between the hollow interior portion of the three chords and support lattice, wherein the controller controls the fuel pump to balance a weight of the fuel between the three chords.

15. The UAV of claim 9, further comprising a floatation device coupled to the truss.

16. An unmanned aerial vehicle (UAV), comprising: a plurality of combustion engine modules, each combustion engine module including a helicopter blade propulsion system; a truss connecting and separating adjacent pairs of the combustion engine modules, each truss including a support lattice connecting each of a first truss chord, a second truss chord, and a third truss chord, wherein at least one of the first truss chord, the second truss chord, and the third truss chord of include a hollow interior portion therein, configured to hold a fuel for the plurality of combustion engine modules; a conduit connecting the hollow interior portion of the first chord of a first truss to the hollow interior portion of the first chord of a second truss; a control system configured to allow a user to control the plurality of combustion engine modules and corresponding helicopter blade propulsion systems; and a lifting harness connected to two or more combustion engine modules in the plurality of combustion engine modules, the lifting harness configured to couple to a load, wherein the lifting harness positions the load directly beneath a center point common to the combustion engine modules of the plurality of combustion engine modules.

17. The UAV of claim 16, wherein the plurality of combustion engine modules includes an even number of combustion engine modules.

18. The UAV of claim 16, wherein the conduit is attached on an exterior of the truss.

19. The UAV of claim 16, further comprising a plurality of baffle plates within the hollow interior portion of the first truss chord, the second truss chord, and the third truss chord.

20. The UAV of claim 16, further comprising at least one floatation device coupled to at least one truss.

* * * * *